(12) United States Patent
Chilukuri et al.

(10) Patent No.: US 10,316,413 B2
(45) Date of Patent: Jun. 11, 2019

(54) SELF-HEALING COATINGS FOR OIL AND GAS APPLICATIONS

(71) Applicants: Anusha Chilukuri, Katy, TX (US); Sankaran Murugesan, Katy, TX (US); Othon Monteiro, Houston, TX (US)

(72) Inventors: Anusha Chilukuri, Katy, TX (US); Sankaran Murugesan, Katy, TX (US); Othon Monteiro, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 241 days.

(21) Appl. No.: 14/829,529

(22) Filed: Aug. 18, 2015

(65) Prior Publication Data

US 2017/0051156 A1    Feb. 23, 2017

(51) Int. Cl.
| | | |
|---|---|---|
| *C09D 5/08* | (2006.01) | |
| *C23C 18/16* | (2006.01) | |
| *C23C 18/50* | (2006.01) | |
| *C23C 4/12* | (2016.01) | |
| *C23C 4/06* | (2016.01) | |
| *C25D 15/00* | (2006.01) | |

(Continued)

(52) U.S. Cl.
CPC .......... *C23C 18/1633* (2013.01); *C09D 5/082* (2013.01); *C09D 7/67* (2018.01); *C09D 7/69* (2018.01); *C23C 4/06* (2013.01); *C23C 18/1662* (2013.01); *C25D 15/00* (2013.01); *C08K 9/10* (2013.01)

(58) Field of Classification Search
CPC .......... C08J 3/226; C08K 3/04; C08L 101/00; H01B 3/42; H01B 3/30; H01B 3/44; H01B 3/307; B32B 27/34; B32B 27/08; B32B 27/302; B32B 27/20; B32B 27/365; B32B 27/36; B32B 2250/02; B32B 2250/24; B32B 2264/10; B32B 2307/204; B32B 2270/00; B32B 2307/724; B32B 2262/106; B32B 2457/00

See application file for complete search history.

(56) References Cited

U.S. PATENT DOCUMENTS

| | | |
|---|---|---|
| 2,468,163 A | 4/1949 | Blair et al. |
| 4,722,805 A | 2/1988 | Martin |
| 7,036,586 B2 | 5/2006 | Roddy et al. |

(Continued)

FOREIGN PATENT DOCUMENTS

WO    2009127852 A1    10/2009

OTHER PUBLICATIONS

Caskey et al. Selected Applications of Metal-Organic Frameworks in Sustainable Energy Technologies, Material Matter (2009), 8 pages.

(Continued)

*Primary Examiner* — Cheng Yuan Huang
(74) *Attorney, Agent, or Firm* — Cantor Colburn LLP

(57) ABSTRACT

A coated article comprises a substrate and a self-healing coating disposed on a surface of the substrate, the self-healing coating comprising a metallic matrix; and a plurality of micro- or nano-sized particles dispersed in the metallic matrix; the micro- or nano-sized particles comprising an active agent disposed in a carrier comprising a micro- or nano-sized metallic container, a layered structure, a porous structure, or a combination comprising at least one of the foregoing.

22 Claims, 2 Drawing Sheets

(51) Int. Cl.
*C09D 7/40* (2018.01)
*C08K 9/10* (2006.01)

(56) References Cited

U.S. PATENT DOCUMENTS

| | | | |
|---|---|---|---|
| 7,057,050 | B2 | 6/2006 | Meyer |
| 7,134,491 | B2 | 11/2006 | Kohli et al. |
| 7,631,697 | B2 | 12/2009 | Bhavsar |
| 8,240,377 | B2 | 8/2012 | Kulakofsky et al. |
| 8,361,609 | B2 | 1/2013 | Cosentino |
| 8,592,352 | B2 | 11/2013 | Karcher et al. |
| 8,664,165 | B2 | 3/2014 | Horton et al. |
| 8,689,894 | B2 | 4/2014 | Regnault De La Mothe Loïc |
| 8,703,285 | B2 | 4/2014 | Blaiszik et al. |
| 8,790,789 | B2 | 7/2014 | Ramgopal et al. |
| 8,920,879 | B2 | 12/2014 | Toohey et al. |
| 2007/0099011 | A1* | 5/2007 | Wilson .................. C23C 24/10 428/457 |
| 2008/0300153 | A1 | 12/2008 | Crews et al. |
| 2010/0320421 | A1* | 12/2010 | Calle .................. B01J 13/14 252/388 |
| 2011/0033721 | A1* | 2/2011 | Rohatgi ................. B22D 19/14 428/548 |
| 2011/0162751 | A1* | 7/2011 | Fitzgerald .............. C23C 30/00 138/145 |
| 2011/0312858 | A1 | 12/2011 | Holt |
| 2012/0015852 | A1* | 1/2012 | Quintero ................ C09K 8/032 507/112 |
| 2012/0052307 | A1 | 3/2012 | Plieth et al. |
| 2012/0235083 | A1* | 9/2012 | Virtanen ................ B82Y 30/00 252/182.2 |
| 2012/0251777 | A1* | 10/2012 | Duval ..................... B22F 1/02 428/144 |
| 2013/0017405 | A1 | 1/2013 | Benkoski et al. |
| 2013/0302392 | A1* | 11/2013 | Mistry .................... A61K 8/11 424/401 |
| 2014/0027129 | A1 | 1/2014 | Hannegan et al. |
| 2014/0036223 | A1* | 2/2014 | Zheng ................... G02B 1/105 351/159.01 |
| 2014/0272392 | A1 | 9/2014 | Fitz et al. |

OTHER PUBLICATIONS

Chaudhuri et al. Core/Shell Nanoparticles: Classes, Properties, Synthesis Mechanisms, Characterization, and Applications. American Chemical Society Publications (2011), Chemical Review (2012) pp. 2373-2433.

El-din, et al.; Structure, Characterization and Anti-Corrosion Activity of the New Metal-Organic Framework [Ag(qox)(4-ab)]; J. Inorg Organoment Polymer; (2011); 21: pp. 327-335.

Ferguson, et al. "Self-Healing Metals and Metal Matrix Composites", The Journal of the Minerals, Metals & Materials Society, Jun. 2014, vol. 66, pp. 866-871.

Hughes, et al.; "Designing green,self-healing coatings for metal protection";NPG Asia Matarial 2(4); 2010; pp. 143-151.

International Search Report and Written Opinion, International Application No. PCT/US2016/046155, dated Nov. 17, 2016, Korean Intellectual Property Office; International Search Report 4 pages, Written Opinion 7 pages.

Kumar, "Self Healing Coatings Using Microcapsules and Nanocapsules", CORROSION, Mar. 28-Apr. 1, 2004, New Orleans, Louisiana.

Kumar, "Self Healing Coatings", CORROSION, Apr. 7-11, 2002, Denver, Colorado.

Kumar, et al. "Self-healing coatings for steel" U.S. Army Engineer Research and Development Center, Construction Engineering Research Laboratory, Nov. 4, 2005; 10 pages.

Monteiro, et al.; Electroplated Ni—B films and Ni—B metal matrix diamond nanocomposite coatings; 2008;retrieved from the internet:;URL:http://www.elsevier.com/locate/surfcoat.pdf; 7 pages.

Morozan, et al;"Metal Organic frameworks for electrochemical applications";Energy Environ. Sci., 2012, 5, 9269; 22 pages.

Moynot-Sauvant, et al.; "Self-healing coatings: An Alternative route for anticorrosion protection"; Progress in Organic Coatings; 2008;9 pages.

R. J. Kuppler et al. Potential applications of metal-organic frameworks, Coordination Chemistry Reviews 253 (2009), pp. 3042-3066.

Rowsell et al. Metal-organic frameworks: a new class of porous materials, Microporous and Mesoporous Materials 72 (2004), pp. 3-14.

Stankiewicz, et al.; Self-healing coatings in anti-corrosion applications; J. Mater Sci; (2013); 11 pages.

Umoren et al., "Recent Developments on the Use of Polymers as Corrosion Inhibitors—A Review", The Open Materials Science Journal, 2014, 8, pp. 39-54.

\* cited by examiner

SELF-HEALING COATINGS FOR OIL AND GAS APPLICATIONS

BACKGROUND

A downhole environment such as an oil or gas well in an oilfield or undersea formations may expose equipment used downhole to severe conditions that may affect the integrity or performance of the equipment. For example, where an article has a metal part, environmental conditions can cause corrosion by contact with hydrocarbon oil, water, inorganic salts, acids, hydrogen sulfide, carbon dioxide, or other corrosive materials found in such environments.

Protective coatings are therefore desirable on such downhole articles, particularly coatings having improved corrosion resistance. It would be a further advantage if such coatings not only provide initial protection to the downhole articles, but also have the ability to repair or heal themselves when compromised.

BRIEF DESCRIPTION

A coated article comprises: a substrate and a self-healing coating disposed on a surface of the substrate, the self-healing coating comprising a metallic matrix; and a plurality of micro- or nano-sized particles dispersed in the metallic matrix; the micro- or nano-sized particles comprising an active agent disposed in a carrier comprising a micro- or nano-sized metallic container, a layered structure, a porous structure, or a combination comprising at least one of the foregoing.

The coated substrate is manufactured by depositing the coating on a surface of a substrate, wherein the depositing comprises electroplating, electrolessly depositing, thermal spraying, or a combination comprising at least one of the foregoing.

BRIEF DESCRIPTION OF THE DRAWINGS

Referring now to the drawings wherein like elements are numbered alike in the several Figures.

DETAILED DESCRIPTION

Figure 1:
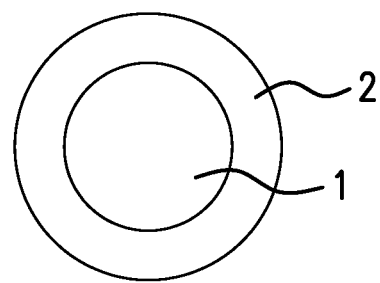
FIG. 1 illustrates a micro/nano particle having a core/shell structure.

The inventors hereof have found that a coating containing a metallic matrix and micro- or nano-sized particles provides protection against corrosion of different metals and alloys used in articles for drilling, evaluation, completion and production of oil and gas. The metallic matrix in the coating has excellent corrosion resistance. In addition, the micro- or nano-sized particles in the coating contain an active agent incorporated in an inert carrier. When the coating is damaged, the active agent is released and provides self-healing effects to the coating thus enhancing the lifetimes of the downhole articles and improving their reliability.

The metallic matrix in the coating includes Ni, Cu, Ag, Au, Sn, Zn, Fe, In, W, Ti, Co, Al, Mg, Cr, or Mo, or alloys of these metals, or a combination that includes at least one of these materials. In an embodiment, the metallic matrix includes an Ni-base alloy, Ti-based alloy, or Al-based alloy, where Ni, Ti, or Al is the majority constituent element by weight or atom percent. In another embodiment, the metallic matrix includes an Ni—B alloy, an Ni—P alloy, or a Ni—W alloy. Exemplary Ni—B alloys contain up to about 10 percent by weight of boron, the balance being Ni and trace impurities. Exemplary Ni—P alloy contains about 14 percent or less by weight P and the balance Ni and trace impurities. An Ni—W alloy (or W—Ni alloy) includes up to about 76 percent by weight of tungsten, and more particularly up to about 30 percent by weight of tungsten. In certain embodiments, this may include about 0.1 to about 76 percent by weight of tungsten, and more particularly about 0.1 to about 30 percent by weight of tungsten. The trace impurities will be those known conventionally for Ni and Ni alloys based on the methods employed to process and refine the constituent element or elements. Exemplary aluminum-based alloys include Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, where X represents alloying elements including Zn, Mn, Si, Cr, Fe, Ni, Ti, V, Cu, Pb, Bi, and Zr.

The self-healing coating also includes a plurality of micro- or nano-sized particles that are dispersed within a metallic matrix. The micro- or nano-sized particles may be dispersed as a homogenous dispersion or a heterogeneous dispersion within the metallic matrix. The micro- or nano-sized particles comprise an active agent and a carrier comprising a micro- or nano-sized metallic container, a layered structure, a porous structure, or a combination comprising at least one of the foregoing. The active agent is encapsulated in a container forming a core/shell structure, intercalated between layers of a material having a layered structure, or absorbed/adsorbed to a material having a porous structure. When a material having both a layered structure and a porous structure, the active agent can be intercalated between the layers, absorbed/adsorbed into pores, or both.

The active agent comprises a corrosion inhibitor, a scale inhibitor, or a combination comprising at least one of the foregoing. It is appreciated that certain materials may have the function of both a corrosion inhibitor and a scale inhibitor.

The corrosion inhibitor can be an organic or inorganic corrosion inhibitor. Organic corrosion inhibitors contain heteroatoms such as S, O, N, P or a combination comprising at least one of the foregoing in the molecule. Without wishing to be bound by theory, it is believed that organic corrosion inhibitors containing S, O, N, P or a combination comprising at least one of the foregoing can adsorb on the exposed metallic surface blocking the active corrosion sites. Organic inhibitors include, but are not limited to, amines, imidazolines, quaternary ammonium compounds, amides, phosphates, sulfur-containing compounds, a polymeric corrosion inhibitor, or a combination comprising at least one of the foregoing.

Any known amines corrosion inhibitors can be used. Amines minimize the effects of acid, and in some cases, the amines form a protective film on the exposed metallic surface helping to prevent corrosion attack from oxygen/carbon dioxide and hydrogen sulfide. As used herein, amine inhibitors include thioamines. Exemplary thioamines include, but are not limited to, N,N-dithio-bis-dimethylamine, N,N-dithio-bis-diethylamine, N,N-dithio-bis-dipropylamine, N,N-dithio-bis-diisopropylamine, N,N-dithio-bis-dibutylamine, N,N-dithio-bis-diisobutylamine, N,N- dithio-bisdiamylamine, N,N-dithio-bis-dihexylamine, N,N-dithiobis-diheptylamine, and N,N-dithio-bis-dioctylamine. Groups such as nonyl, decyl, undecyl and dodecyl may be present but the molecular weight may become so high that the limits of practical dosage are exceeded. Still further examples are N,N-dithio-bis-dicyclohexylamine, N,N-dithio-bis-ditetrahydrofurylamine, N,N-dithio-bis-ditetrahydrothienylamine, N,N-dithio-bis-di-3-cyanoethylamine, N,N-dithio-bis-di-3-chlorethylamine, N,N-dithio-bis-di-3-phenethylamine, N,N-dithio-bis-dibenzylamine, N,N-dithio-bis-ditetrahydrofurfuryl amine, N'',N'-dithio-bis-ditetrahydrothieeylamine, N,N-dithio-bis-N-methylcyclohexylamine, N,N-dithio-bis-N-ethylcyclohexylamine, N,N-dithio-bis-N-isopropylcyclohexylamine, hexylaminopropionitrile, N,N-dithio-bis-tetrahydrofurylaminopropionitrile, N,N-dithio-bis-piperidine, N,N-dithio-bis-a-pipecoline and N,N-dithio-bis-morpholine. The N,N-monothioamines, as: for example N,N-thio-bis-morpholine, N,N-thio-bis-dimethylamine, N,N-thio-bis-diethylamine, N,N-thio-bis-dipropylamine, and N,N-thio-bis-diisopropylamine. Other exemplary amine inhibitors include rosin amine, oxyalkylated rosin amine, dimethylethanolamine, dimethylisopropanolamine, ethylenediamine, methoxypropylamine, monoethanolamine, morpholine, picolines, or triemthylamine.

Imidazoline inhibitors are not particularly limited. Exemplary imidazolines are described for example in U.S. Pat. Nos. 2,468,163, 4,722,805 and 7,057,050. As used herein, imidazoline corrosion inhibitors include the derivatives of imidazolines. For example, suitable imidazolines include fatty acid imidazolines containing an imidazoline, a hydrocarbon tail group having at least 10 or 15 carbon atoms and a short pendent group such as an ethylamino group.

When the corrosion inhibitor is a quaternary ammonium compound, it includes a quaternary ammonium compound having from about 2 to about 30 carbons. Exemplary quaternary ammonium compounds include, but are not limited to, quaternized alkylpyridines and quaternized fatty amines.

Amides are produced from carboxylic acids and amines. Suitable carboxylic acids include fatty acids having more than 5, 8, or 10 carbon atoms. An exemplary amine is polyamine having the structure $H_2N(-R-NH)_xH$ wherein R is an alkylene group and x is an integer greater than 1. Other known amide corrosion inhibitors can also be used.

A mono-, di- or tri-basic soluble phosphate salt can be used as a corrosion inhibitor. Exemplary phosphate salts employed include $LiH_2PO_4$, $NaH_2PO_4$, $Na_2HPO_4$, $Na_3PO_4$, $KH_2PO_4$, $K_2HPO_4$; $K_3PO_4$; and combinations thereof.

Exemplary phosphate esters include but are not limited to: methyl phosphate, dimethyl phosphate, trimethyl phosphate, ethyl phosphate, diethyl phosphate, triethyl phosphate, butyl phosphate, dibutyl phosphate, tributyl phosphate, 2-ethylhexyl phosphate, 2-diethyhexyl phosphate, tri(2-ethylhexyl) phosphate, butoxyethyl phosphate, dibutoxyethyl phosphate tributoxyethyl phosphate, phenyl phosphate, diphenyl phosphate, triphenyl phosphate, cresyl phosphate, dicresyl phosphate, tricresyl phosphate, xylenyl phosphate, dixylenyl phosphate, trixylenyl phosphate, isopropylphenyl phosphate, bis(isopropylphenyl)phosphate, tris(isopropylphenyl) phosphate, (phenylphenyl)phosphate, bis(phenylphenyl) phosphate, tris(phenylphenyl)phosphate, naphthyl phosphate, dinaphthyl phosphate, trinaphthyl phosphate, cresyldiphenyl phosphate, xylenyldiphenyl phosphate, diphenyl(2-ethylhexyl)phosphate, di(isopropylphenyl)phenylphosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, poly(oxy-1,2-ethanediyl), alpha-tridecyl-omega-hydroxy-, phosphate, melamine pyrrophosphate, triphenyl phosphine oxide, tricredyl phosphine oxide, poly(oxy-1,2-ethanediyl), a-hydro-w-hydroxy-, mono-C8-10-alkyl ethers, phosphates, diphenyl methane phosphonate, diethyl phenylphosphonate, amphiphilic monoalkyl phosphate esters with different chain lengths such as mono-n-butyl phosphate ester, mono-n-hexyl phosphate ester, and mono-n-octyl phosphate ester and the like.

Aromatic condensed phosphate esters may also be used and include, but are not limited to resorcinol polyphenylphosphate, resorcinol poly(di-2,6-xylyl)phosphate, bisphenol A polycredylphosphate, hydroquinone poly(2,6-xylyl) phosphate, and a condensate thereof.

The thiophophate esters useful as the corrosion inhibitor include, but are not limited to bis(2-ethylhexyl)thiophosphate, diethyl thiophosphate, dimethyl thiophosphate, bis(2-ethylhexyl)dithiophosphate, diethyl dithiophosphate and dimethyl dithiophosphate. Dilauryl dithiophosphate, a lauryl trithiophosphite and a triphenyl thiophosphate may also be used with the methods of the application.

The Mannich Reaction Products (MRP) can be used as corrosion inhibitors. MRP may be prepared by any means known to those skilled in art to be useful for preparing such products. For example, in one embodiment, the Mannich Reaction Product may be prepared by in situ Mannich reaction of tris(hydroxymethyl)aminomethane with a mixture of the corresponding nitroparaffin and formaldehyde followed by reduction of the nitro group of the product to an amine via hydrogenation in the presence of a hydrogenation catalyst. In another embodiment, the Mannich Reaction Product may be prepared by admixing a phenol, an alkanolamine, and formaldehyde mixed in molar ratios resulting in an initiator which can be alkoxylated to prepare polyols.

In another embodiment of the disclosure, the Mannich Reaction Product may be prepared using an aldehyde such as formaldehyde, acetaldehyde, propionaldehyde, butyraldehyde, valeraldehyde, caproaldehyde, heptaldehyde, and stearaldehyde, benzaldehyde, salicylaldehyde, furfural, thiophene aldehyde, and formaldehyde-producing reagents, where the formaldehyde-producing regent is paraformaldehyde and formalin. This would include formaldehyde, but could also include other aldehydes such a propionaldehyde.

The phenol component may be phenol and 4,4'-dihydroxydiphenylpropane-2,2; but also alkyl substituted phenols wherein the aromatic ring may have one or more alkyl moieties having from 1 to 20 carbons. One such compound is nonyl phenol.

Organic corrosion inhibitors include naturally occurring polymers as well as synthetic polymers. Polymeric corrosion inhibitors are described, for example, in The Open Materials Science Journal, 2014, Volume 8, Page 39-54. Naturally occurring polymeric corrosion inhibitors include chitosan, pectin, starch, carboxymethyl cellulose, gum arabic, hydroxy-ethyl cellulose, gellan gum, or a combination comprising at least one of the foregoing. Exemplary synthetic polymeric corrosion inhibitors include polyethylene glycol, polyuria, polyvinyl pyrrolidone, poly vinyl alcohol, poly(o-phenylenediamine), polyaniline, polypyrrole, polyacrylic acid, or a combination comprising at least one of the foregoing.

Inorganic corrosion inhibitors include a vanadate, a molybdate, a tungstate, a chromate, a lanthanide, a niobate, a cerate, a borate, or a combination comprising at least one of the foregoing. Sodium vanadate, sodium molybdates, and ceria are specifically mentioned.

Scale inhibitors are known and include inorganic polyphosphates, organic phosphate esters, organic phosphonates, organic aminophosphates, organic polymers, and the like. Exemplary polymeric scale inhibitors include polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

The active agent can be encapsulated in a micro- or nano-sized metallic container or shell. In an embodiment, the micro- or nano-sized particles have a core-shell structure. FIG. 1 illustrates a micro/nano particle having a core 1 and a shell or container 2 where the core comprises the active agent and the shell comprises a metallic composition.

The metallic shell or container comprises Fe, Zn, Ni, Cu, Ag, Au, W, Ti, Co, Al, Mg, Cr, Mo, alloys thereof, or a combination comprising at least one of the foregoing. Advantageously, the metallic shell or container is compatible with the metallic matrix of the coating such that the encapsulated active agent can be evenly distributed in the matrix; and the coatings formed therefrom have uniform properties. In an embodiment, the container and the coating matrix have at least one common metal. For example, when the metallic matrix comprises plain carbon or low alloy steels, the micro- or nano-sized metallic container for the active agent can be iron. As another example, when the metallic matrix comprises a nickel-based alloy, the micro- or nano-sized container can comprise nickel or a nickel alloy, which is the same as or different from the metallic matrix.

The core-shell micro- or nano-sized particles are produced by various synthesis approaches like laser pyrolysis, chemical vapor deposition (CVD), Sol-gel, or reverse micelle. Methods of preparing the core-shell particles have been described by Chaudhuri et al. in Chem. Rev., 2012, 112(4), pp 2373-2433.

Figure 2:
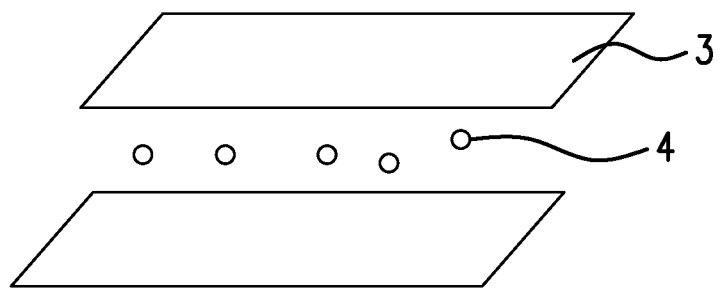
FIG. 2 illustrates a micro/nano particle having an active agent intercalated between the layers of a material having a layered structure.

The active agent can also be intercalated between the layers of a compound having a layered structure. Suitable compounds having a layered structure include a hydrotalcite, nanoclay, zeolite including bentonite, metal organic frameworks (MOF), an oxide layered material, or a combination comprising at least one of the foregoing. There may be overlaps between these materials. Such particles are illustrated in FIG. 2. As shown in FIG. 2, the active agent 4 is disposed between layers 3 of a carrier. Nanoclays are nanoparticles of layered mineral silicates and include, for example, montmorillonite, bentonite, kaolinite, hectorite, and halloysite. The zeolite can be a naturally occurring or synthetic zeolite. Exemplary zeolites include faujasite, montesommaite, mordenite, stellerite, stilbite, Zeolite A, Zeolite X, Zeolite Y, and Zeolite ZSM-5. As used herein, MOF refers to compounds having metal ions or clusters coordinated to organic ligands. Exemplary ligands for MOF include oxalic acid, malonic acid, succinic acid, glutaric acid, phthalic acid, isophthalic acid, terephthalic acid, citric acid, trimesic acid, 1,2,3-triazole, pyrrodiazole, or squaric acid. Structures of MOF and methods of preparation have been described, for example, in Microporous and Mesoporous Materials 73 (2004) 3-14. Exemplary oxide layered material includes spinels, pervoskites, pyrochlore, double metal hydroxides, and the like.

Exemplary particles comprising an active agent intercalated between the layers of a material having a layered structure include hydrotalcite molybdates, hydrotalcite chromates, hydrotalcite tungstates, or a combination comprising at least one of the foregoing. These particles can be made by combing a hydrotalcite with a solution of the active agent to form an intercalated product, and separating the intercalated product from the solution.

The active agent can also be adsorbed or absorbed in a material having a porous structure. The material having a porous structure comprises nanoclay including bentonite, a zeolite, a molecular sieve, metal organic frameworks (MOF) or a combination comprising at least one of the foregoing. The particles can be made by mixing the material having a porous structure and a solution of the active agent, and removing the solvent. Bentonites used to make the particles include zinc bentonites, calcium bentonites, praseodymium bentonites, or a combination comprising at least one of the foregoing. Zeolites and molecular sieves are commercially available. The pore size of the porous material is not particularly limited and can vary depending on the active agent used and the desired leach rate.

The micro- or nano-sized particles may have different sizes, shapes and surface morphology. The shapes include spherical, centric, eccentric, start, tubular, or the like. The particles can have an average particle size of about 10 nm to about 500 microns, or about 50 nm to about 250 microns, or about 100 nm to about 100 microns. As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. For the particles having a core/shell structure, the thickness of the shell is about to about 5 nm to about 100 nm or about 10 nm to about 50 nm.

The micro- or nano-sized particles are provided in any suitable amount relative to the coating, particularly about 0.5% to about 40% by volume of the coating, more particularly from about 5% to about 30% by volume of the coating, and even more particularly from about 5% to about 20% by volume of the coating.

The coating can optionally comprise additional particles including carbon, boron, a carbide, a nitride, an oxide, a boride or a solid lubricant, including $MoS_2$, BN, or polytetrafluoroethylene (PTFE) solid lubricants, or a combination comprising at least one of the foregoing. These may include any suitable carbides, nitrides, oxides and borides, particularly metallic carbides, nitrides, oxides and borides. Carbon nanoparticles may include any suitable form thereof, including various fullerenes or graphenes. Fullerenes may include those selected from the group consisting of buckeyballs, buckeyball clusters, buckeypaper, single-wall nanotubes or multi-wall nanotubes, or a combination thereof.

The thickness of the self-healing coating can be from about 0.1 μm to about 10 mm, about 5 μm to about 10 mm, specifically about 10 μm to about 5 mm. In an embodiment, the coating is continuous and does not have voids, microvoids, fractures, or other defects, including pinholes and the like.

The coating formed on the substrate can completely cover the substrate or a surface of the substrate. The substrate can comprise a metal or an alloy. It can be used without surface processing or can be processed, including chemically, physically, or mechanically treating the substrate. For example, the substrate can be treated to roughen or increase a surface area of the substrate, e.g., by sanding, lapping, or sand blasting. A surface of the substrate can also be cleaned to remove contaminants through chemical and/or mechanical means.

The metal of the substrate includes elements from Group 1 to Group 12 of the periodic table, alloys thereof, or a combination thereof. Exemplary metals are magnesium, aluminum, titanium, manganese, iron, cobalt, nickel, copper, molybdenum, tungsten, palladium, chromium, ruthenium, gold, silver, zinc, zirconium, vanadium, silicon, or a combination thereof, including alloys thereof. Metal alloys include, for example, an aluminum-based alloy, magnesium-based alloy, tungsten-based alloy, cobalt-based alloy, iron-based alloy, nickel-based alloy, cobalt and nickel-based alloy, iron and nickel-based alloy, iron and cobalt-based alloy, copper-based alloy, and titanium-based alloy. As used herein, the term "metal-based alloy" means a metal alloy wherein the weight percentage of the specified metal in the alloy is greater than the weight percentage of any other component of the alloy, based on the total weight of the alloy. Exemplary metal alloys include steel, nichrome, brass, pewter, bronze, invar, inconel, hastelloy, MgZrZn, MgAlZn, AlCuZnMn, and AlMgZnSiMn.

The substrate can be any shape. Exemplary shapes include a cube, sphere, cylinder, toroid, polygonal shape, helix, truncated shape thereof, or a combination thereof. The longest linear dimension of the substrate can be from 500 nm to hundreds of meters, without limitation. The substrate can have a thermal decomposition temperature that can withstand, without decomposition or degradation, exposure to a temperature from −10° C. to 800° C. However, coating disposed on the substrate can provide temperature shielding or thermal conductance to carry heat away from the substrate so that the substrate does not experience a temperature near its thermal decomposition temperature.

A self-healing coating having dispersed micro- or nano-sized particles disposed therein may be disposed on the surface of substrate using any suitable deposition method, including electroless deposition, electrodeposition or galvanic deposition, thermal spraying, or a combination comprising at least one of the foregoing.

In an exemplary embodiment, a self-healing coating comprising Ni as the metallic matrix material and dispersed micro- or nano-sized particles, is deposited by electroless deposition, electrodeposition or galvanic deposition, for example, using a nickel sulfate bath having a plurality of micro- or nano-sized particles dispersed therein. In another exemplary embodiment, a self-healing coating comprising an Ni—P alloy as the metallic matrix material having a plurality of dispersed micro- or nano-sized particles, may be deposited by electroless deposition, electrodeposition or galvanic deposition using a bath that includes nickel sulfate, sodium hypophosphite, and a plurality of micro- or nano-sized particles dispersed therein. In yet another exemplary embodiment, a self-healing coating comprising an Ni—W alloy as metallic matrix material having a plurality of dispersed micro- or nano-sized particles, may be deposited by electroless deposition, electrodeposition or galvanic deposition using a bath that includes nickel sulfate, sodium tungstate, and a plurality of micro- or nano-sized particles dispersed therein. The self-healing coatings that include a Ni—P alloy may be precipitation hardened to increase the hardness by annealing the metallic coating sufficiently to cause precipitation of $Ni_3P$ precipitates. A self-healing coating comprising an Ni—B alloy as metallic matrix material having a plurality of dispersed micro- or nano-sized particles, may be deposited by electroless deposition, electrodeposition or galvanic deposition using a bath that includes nickel sulfate and a boron source such as trimethylamine borane having a plurality of micro- or nano-sized particles dispersed therein.

Thermal spraying is a coating process that spraying molten or heat softened material onto a surface at high velocity to provide a coating. Thermal spraying includes plasma spraying. In a plasma spraying process, a coating material in the form of powder or wire is injected into a high temperature plasma flame, where it is heated and accelerated to a high velocity. The hot material affects the substrate surface and cools forming a coating. In a plasma spraying process, the substrate temperature can be kept low during processing avoiding damage, metallurgical changes and distortion to the substrate material. A combination of metallic matrix material and micro- or nano-sized particles can be thermally sprayed on a surface of the substrate forming a self-healing coating.

Figure 3:
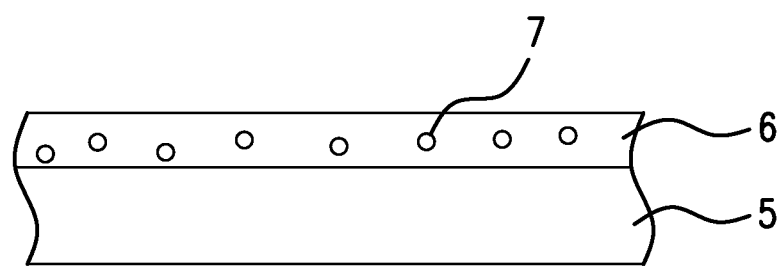
FIG. 3 shows a cross-section of a coated substrate according to an embodiment of the disclosure.
Figure 4A:
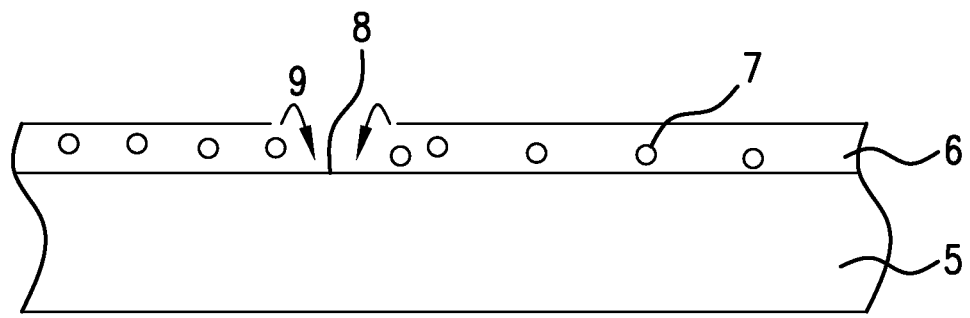
FIG. 4(A) is a schematic illustration of a coating having a defect.
Figure 4B:
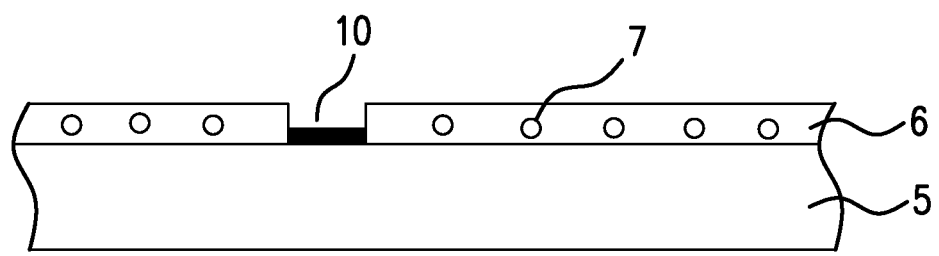
FIG. 4(B) is a schematic illustration of a self-healing response.

The coatings disclosed herein have self-healing effects. When the coating is damaged due to harsh aggressive environments, the active agent can be released or leached out and protect the exposed metal surface from corrosion. The harsh aggressive environments include a mechanical force, a change of pH, temperature, pressure, radiation, or a combination comprising at least one of the foregoing. The process can be a chemical process, a physical process, or a combination of at least one of the foregoing. A chemical process includes an ion exchange process, an electrochemical process, or a combination thereof. For example, upon exposure of a damaged coating containing hydrotalcite vanadates to brine solutions, vanadates are released by an ion exchange process and adsorbed to the exposed metal areas, isolating the defect from the aggressive brine. As another example, the shell or container of micro- or nano-sized particles corrodes by a chemical process or destroyed by mechanical abrasion/erosion, exposing the active agent and provides self-healing effects. FIG. 3 illustrates a coated substrate having substrate 5 and coating 6 disposed on a surface of the substrate. The coating contains a plurality of micro- or nano-sized particles 7. FIG. 4(A) is a schematic illustration of a coating having a defect 8. FIG. 4(B) illustrates a self-healing response. As shown in FIG. 4(B), active agents 9 are released from the carrier and forming a passivation layer 10 over the metal substrate, preventing the occurrence of further corrosion reactions.

The coatings provide protection against corrosion of different metals and alloys and are useful for a wide variety of applications including but are not limited to aerospace, automotive, oil and gas, and marine applications. In an embodiment, the coating provides protection to equipment used in the drilling, evaluation, completion and production of oil and gas. The coated article is a downhole element.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A coated article comprising:
   a substrate; and
   a self-healing coating disposed on a surface of the substrate;
   the self-healing coating comprising
      a continuous metallic matrix formed from Ni, Cu, Ag, Au, Sn, Fe, In, W, Ti, Co, Al, Mg, Cr, Mo, or an alloy thereof, or a combination thereof; and
      a plurality of micro- or nano-sized particles dispersed in the continuous metallic matrix;
   the micro- or nano-sized particles having a core-shell structure comprising an active agent encapsulated in a micro- and nano-sized metallic container shell,
   wherein the micro- or nano-sized metallic container and the continuous metallic matrix have at least one common metal; and
   the micro- or nano-sized particles have a number average particle size of about 100 nm to about 100 microns; and
   the micro- or nano-sized metallic container shell has a thickness of about 10 nanometers to about 50 nanometers.

2. The coated article of claim 1, wherein the micro- or nano-sized metallic container comprises Fe, Zn, Ni, Cu, Ag, Au, W, Ti, Co, Al, Mg, Cr, Mo, alloys thereof, or a combination comprising at least one of the foregoing.

3. The coated article of claim 1, wherein the active agent comprises a corrosion inhibitor, a scale inhibitor, or a combination comprising at least one of the foregoing.

4. The coated article of claim 3, wherein the active agent comprises an inorganic corrosion inhibitor, an organic corrosion inhibitor comprising at least one of S, N, O, P, or a combination comprising at least one of the foregoing corrosion inhibitors.

5. The coated article of claim 3, wherein the corrosion inhibitor comprises an amine, an imidazoline, a quaternary compound, an amide, a phosphate, a sulfur-containing compound, a vanadate, a molybdate, a tungstate, a chromate, a lanthanide, a niobate, a cerate, a borate, a polymeric corrosion inhibitor, or a combination comprising at least one of the foregoing.

6. The coated article of claim 1, wherein the active agent is released from the micro- or nano-sized particles in response to a mechanical damage to the coating, a change of pH, temperature, pressure, radiation, or a combination comprising at least one of the foregoing.

7. The coated article of claim 1, wherein the continuous metallic matrix comprises a nickel-based alloy or Ti-based alloy.

8. The coated article of claim 1, wherein the self-healing coating further comprises carbon, boron, a carbide, a nitride, an oxide, a boride or a solid lubricant, or a combination comprising at least one of the foregoing.

9. The coated article of claim 1, wherein the micro- or nano-sized particles are present in an amount of about 0.5 volume percent to about 40 volume percent based on the total volume of the self-healing coating.

10. The coated article of claim 1, wherein the substrate comprises iron, magnesium, aluminum, titanium, manganese, cobalt, nickel, copper, molybdenum, tungsten, palladium, chromium, ruthenium, gold, silver, zinc, zirconium, vanadium, silicon, an alloy thereof, or a combination comprising at least one of the foregoing.

11. The coated article of claim 1, wherein the self-healing coating has a thickness of about 0.1 micron to 10 mm.

12. The coated article of claim 1, wherein the coated article is a downhole element.

13. The coated article of claim 1, wherein the continuous metallic matrix comprises a Ni—P alloy, a Ni—B alloy, or a Ni—W alloy.

14. The coated article of claim 1, wherein the active agent is an imidazoline corrosion inhibitor.

15. The coated article of claim 1, wherein the self-healing coating is configured to provide temperature shielding or thermal conductance to carry heat away from the substrate so that the substrate does not experience a temperature near its thermal decomposition temperature.

16. The coated article of claim 1, wherein the micro- or nano-sized particles are homogeneously dispersed in the continuous metallic matrix.

17. The coated article of claim 1, wherein the micro- or nano-sized metallic container comprises Fe, Zn, Cu, Ag, Au, W, Ti, Co, Mg, Mo, alloys thereof, or a combination comprising at least one of the foregoing.

18. A coated article comprising:
   a substrate comprising a metal or an alloy; and
   a self-healing coating having a thickness of about 10 nm to about 5 mm disposed on a surface of the substrate;
   the self-healing coating comprising
      a continuous metallic matrix comprising a nickel-based alloy, a Ti-based alloy, or an Al-based alloy;
      about 5% to about 30% by volume of the coating a plurality of micro- or nano-sized particles dispersed in the continuous metallic matrix;
   the micro- or nano-sized particles having a core-shell structure comprising an active agent encapsulated in a micro- or nano-sized metallic container shell, the micro- or nano-sized particles having a number average particle size of about 100 nm to about 100 microns, the active agent comprising a corrosion inhibitor, a scale inhibitor, or a combination comprising at least one of the foregoing, and the metallic container shell having a thickness of about 10 nanometers to about 50 nanometers,
   wherein the micro- or nano-sized metallic container and the continuous metallic matrix have at least one common metal.

19. The coated article of claim 18, wherein the corrosion inhibitor comprises an amine, an imidazoline, a quaternary compound, an amide, a phosphate, a sulfur-containing compound, a vanadate, a molybdate, a tungstate, a chromate, a lanthanide, a niobate, a cerate, a borate, a polymeric corrosion inhibitor, or a combination comprising at least one of the foregoing.

20. The coated article of claim 18, wherein the continuous metallic matrix comprises a Ni—P alloy, a Ni—B alloy, or a Ni—W alloy.

21. A method of manufacturing the coated article of claim 1, the method comprising:
depositing on the surface of the substrate the self-healing coating comprising the continuous metallic matrix formed from Ni, Cu, Ag, Au, Sn, Fe, In, W, Ti, Co, Al, Mg, Cr, Mo, or an alloy thereof, or a combination thereof; and the plurality of micro- or nano-sized particles dispersed in the continuous metallic matrix; the micro- or nano-sized particles having the core-shell structure comprising the encapsulated in the micro- or nano-sized metallic container shell, the micro- or nano-sized metallic container and the continuous metallic matrix having at least one common metal; the micro- or nano-sized particles having a number average particle size of about 100 nm to about 100 microns; and the micro- or nano-sized metallic container shell having a thickness of about 10 nanometers to about 50 nanometers,
wherein the depositing comprises electroplating, electrolessly depositing, thermal spraying, or a combination comprising at least one of the foregoing.

22. The method of claim 21, wherein the continuous metallic matrix comprises a nickel-based alloy, a Ti-based alloy, or an Al-based alloy; and the active agent comprises a corrosion inhibitor, a scale inhibitor, or a combination comprising at least one of the foregoing.

\* \* \* \* \*